(12) United States Patent
Ono

(10) Patent No.: US 10,035,613 B2
(45) Date of Patent: Jul. 31, 2018

(54) PACKAGING APPARATUS

(71) Applicant: Ishida Co., Ltd., Kyoto (JP)

(72) Inventor: Tsuyoshi Ono, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 174 days.

(21) Appl. No.: 15/002,714

(22) Filed: Jan. 21, 2016

(65) Prior Publication Data

US 2016/0214752 A1 Jul. 28, 2016

(30) Foreign Application Priority Data

Jan. 22, 2015 (JP) ................. 2015-009961

(51) Int. Cl.
*B65B 51/22* (2006.01)
*B29C 65/00* (2006.01)
(Continued)

(52) U.S. Cl.
CPC .............. *B65B 51/22* (2013.01); *B29C 65/18* (2013.01); *B29C 65/305* (2013.01);
(Continued)

(58) Field of Classification Search
CPC ......... B65B 51/16; B65B 51/22; B65B 53/00; B65B 11/00; B65B 11/004; B65B 11/18;
(Continued)

(56) References Cited

U.S. PATENT DOCUMENTS 2,016,627 A * 10/1935 Conti ...................... B65B 51/16
493/111

2,068,439 A * 1/1937 Staves ..................... B65B 51/16
53/387.2

(Continued)

FOREIGN PATENT DOCUMENTS

CN     1453187 A     11/2003
CN    101987661 A     3/2011
(Continued)

OTHER PUBLICATIONS

First Office Action issued by the State Intellectual Property Office of People's Republic of China dated Aug. 3, 2017, which corresponds to Chinese Patent Application No. 201610032582.0 and is related to U.S. Appl. No. 15/002,714.
(Continued)

*Primary Examiner* — Hemant M Desai
*Assistant Examiner* — Eduardo R Ferrero
(74) *Attorney, Agent, or Firm* — Studebaker & Brackett PC

(57) ABSTRACT

A packaging apparatus includes a packaging unit and two heater rollers. The packaging unit installs a stretch film on an article to be packaged and discharges the article to be packaged installed with the stretch film along a conveyance surface. The two heater rollers heat the stretch film positioned below the article to be packaged discharged from the packaging unit. The heater rollers have contact portions with the article to be packaged positioned higher than the conveyance surface. Among the two heater rollers, height of the contact portion of one heater roller on a upstream side in a discharge direction relative to the conveyance surface is lower than height of the contact portion of the other heater roller on a downstream side in the discharge direction relative to the conveyance surface.

6 Claims, 11 Drawing Sheets

(51) Int. Cl.

| | | |
|---|---|---|
| B65B 11/54 | (2006.01) | |
| B65B 35/20 | (2006.01) | |
| B65B 35/56 | (2006.01) | |
| B65B 49/02 | (2006.01) | |
| B65B 49/08 | (2006.01) | |
| B65B 51/16 | (2006.01) | |
| B65B 57/04 | (2006.01) | |
| B65B 57/14 | (2006.01) | |
| B65B 59/02 | (2006.01) | |
| B65B 61/26 | (2006.01) | |
| B65B 67/10 | (2006.01) | |
| B65B 53/00 | (2006.01) | |
| B65B 57/10 | (2006.01) | |
| B29C 65/18 | (2006.01) | |
| B29C 65/30 | (2006.01) | |
| B29C 65/78 | (2006.01) | |
| B65B 41/16 | (2006.01) | |

(52) U.S. Cl.
CPC ...... *B29C 65/7891* (2013.01); *B29C 66/1122* (2013.01); *B29C 66/5326* (2013.01); *B29C 66/826* (2013.01); *B29C 66/83411* (2013.01); *B29C 66/849* (2013.01); *B65B 11/54* (2013.01); *B65B 35/20* (2013.01); *B65B 35/56* (2013.01); *B65B 49/02* (2013.01); *B65B 49/08* (2013.01); *B65B 51/16* (2013.01); *B65B 53/00* (2013.01); *B65B 57/04* (2013.01); *B65B 57/10* (2013.01); *B65B 57/14* (2013.01); *B65B 59/02* (2013.01); *B65B 61/26* (2013.01); *B65B 67/10* (2013.01); *B29C 66/71* (2013.01); *B29C 66/7392* (2013.01); *B29C 66/81465* (2013.01); *B29C 66/944* (2013.01); *B65B 41/16* (2013.01)

(58) Field of Classification Search
CPC ......... B65B 11/48; B65B 51/10; B65B 11/22; B65B 51/18; B65B 11/54; B65B 35/20; B29C 65/02; B29C 65/18; B29C 65/30; B29C 65/305; B29C 65/7891; B29C 66/1122; B29C 66/826; B29C 66/849
USPC .................. 53/228, 374.4, 376.2, 465, 209
See application file for complete search history.

(56) References Cited

U.S. PATENT DOCUMENTS

| | | | | | |
|---|---|---|---|---|---|
| 3,064,403 | A * | 11/1962 | Tokos | ............... | B65B 51/18 53/371.4 |
| 3,625,802 | A * | 12/1971 | Schniepp | ............ | B29C 65/18 156/251 |
| 3,816,969 | A * | 6/1974 | Zimmerman | ........... | B65B 11/22 53/210 |
| 3,844,872 | A * | 10/1974 | Lenoir | ............... | B29C 65/18 156/498 |
| 4,041,673 | A * | 8/1977 | Brooke | ............... | B29C 65/18 53/373.9 |
| 4,365,456 | A * | 12/1982 | Ullman | ............... | B65B 11/50 53/297 |
| 4,624,096 | A * | 11/1986 | Nordstrom | ............. | B65B 11/12 53/209 |
| 4,709,531 | A * | 12/1987 | Denda | ............... | B65B 11/54 198/456 |
| 4,737,231 | A * | 4/1988 | Seko | ............... | B29C 65/18 100/328 |
| 5,157,903 | A * | 10/1992 | Nakashima | ............. | B65B 11/54 493/476 |
| 5,189,864 | A * | 3/1993 | Cinotti | ............... | B65B 25/14 53/228 |
| 5,205,104 | A * | 4/1993 | Nakashima | ............. | B65B 11/54 53/389.2 |
| 5,287,679 | A * | 2/1994 | Dall'Omo | ............... | B29C 65/02 53/228 |
| 5,447,586 | A * | 9/1995 | Tam | ............... | B29C 53/8041 156/169 |
| 5,507,134 | A * | 4/1996 | Takeda | ............... | B65G 43/08 53/247 |
| 5,761,878 | A * | 6/1998 | Walkiewicz, Jr. | ...... | B29C 65/18 156/515 |
| 5,791,125 | A * | 8/1998 | Kallner | ............... | B65B 51/16 53/370.7 |
| 6,474,041 | B1 * | 11/2002 | Gambetti | ............... | B65B 11/10 53/141 |
| 6,666,005 | B1 * | 12/2003 | Ohshita | ............... | B29C 65/18 53/329.3 |
| 6,736,182 | B2 | 5/2004 | Smith et al. | | |
| 6,799,410 | B2 * | 10/2004 | Gamberini | ............ | B65B 11/20 53/224 |
| 2002/0008332 | A1 * | 1/2002 | Mishra | ............... | B29C 37/04 264/322 |
| 2002/0179607 | A1 * | 12/2002 | Iwasaki | ............... | B65D 45/16 220/324 |
| 2003/0230387 | A1 * | 12/2003 | Smith | ............... | B29C 65/18 156/581 |
| 2011/0023413 | A1 * | 2/2011 | Suzuki | ............... | B65B 11/10 53/131.5 |
| 2011/0167763 | A1 * | 7/2011 | Waldherr | ............... | B29C 65/18 53/371.8 |
| 2011/0314771 | A1 * | 12/2011 | Dall'omo | ............... | B29C 65/18 53/376.7 |
| 2014/0224619 | A1 * | 8/2014 | Takahashi | ............. | B65G 47/24 198/474.1 |
| 2016/0039552 | A1 * | 2/2016 | Koyama | ............... | B65B 11/54 53/556 |

FOREIGN PATENT DOCUMENTS

| | | |
|---|---|---|
| JP | 2000-168717 A | 6/2000 |
| JP | 2002-029513 A | 1/2002 |
| JP | 2003-095208 A | 4/2003 |
| JP | 2004-217258 A | 8/2004 |
| JP | 2005-075450 A | 3/2005 |
| JP | 2009-126550 A | 6/2009 |
| JP | 2011-020700 A | 2/2011 |
| JP | 4824193 B2 | 11/2011 |

OTHER PUBLICATIONS

The extended European search report issued by the European Patent Office dated Jun. 2, 2016, which corresponds to European Patent Application No. 16151068.0-1708 and is related to U.S. Appl. No. 15/002,714.

An Office Action; "Notification of Reasons for Refusal" issued by the Japanese Patent Office dated Aug. 8, 2017, which corresponds to Japanese Patent Application No. 2015-009961 and is related to U.S. Appl. No. 15/002,714; with English language Translation.

An Office Action issued by the State Intellectual Property Office of People's Republic of China dated Dec. 19, 2017, which corresponds to Chinese Patent Application No. 201610032582.0 and is related to U.S. Appl. No. 15/002,714.

* cited by examiner

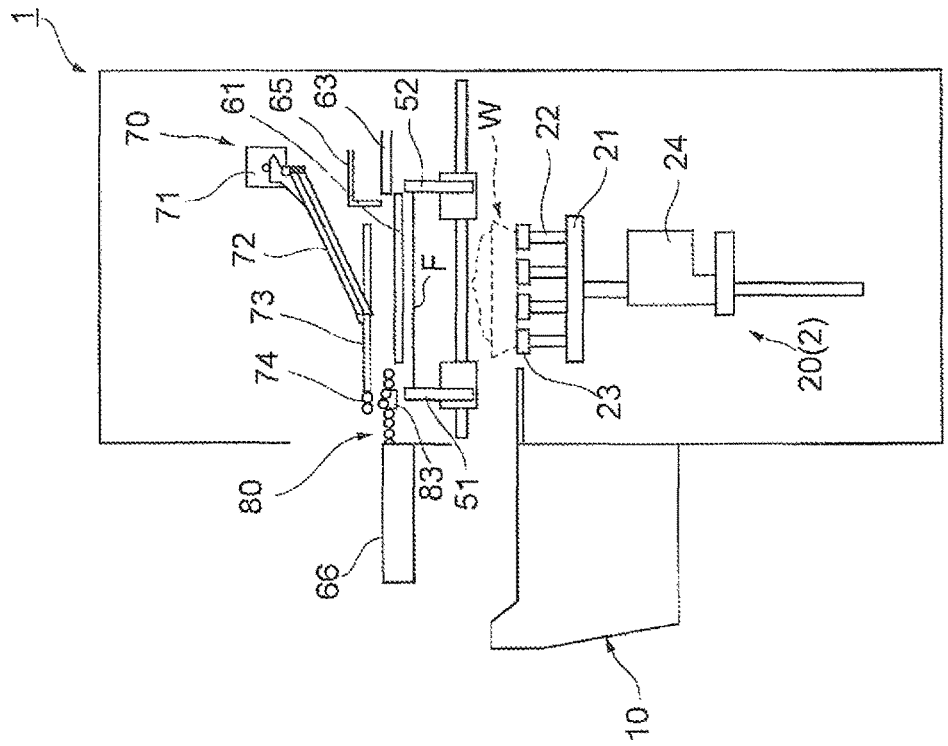
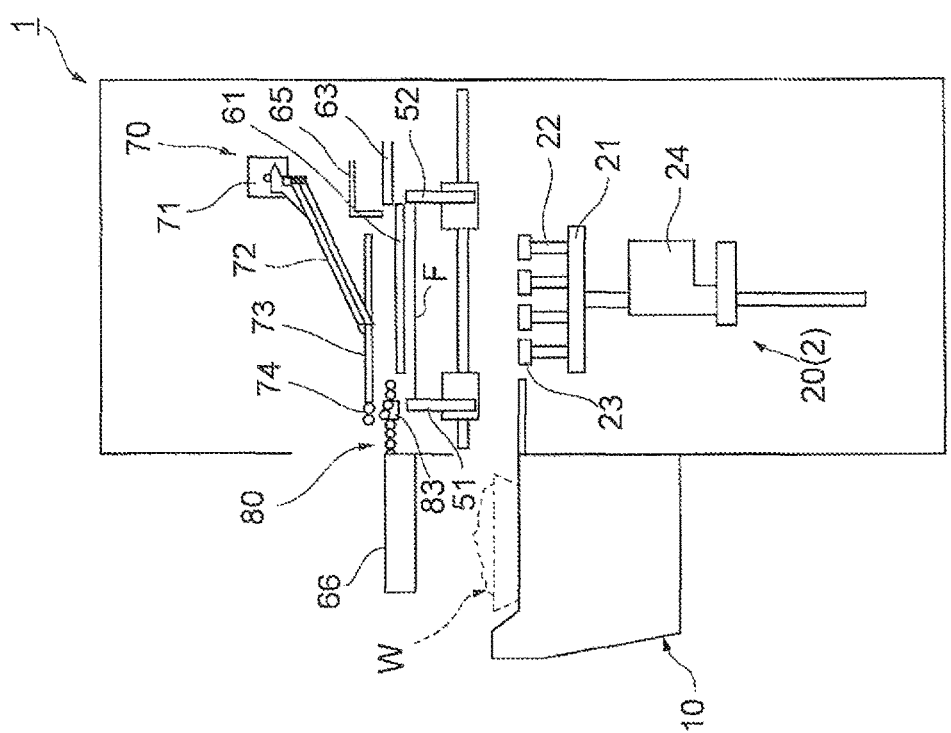

PACKAGING APPARATUS

TECHNICAL FIELD

One aspect of the present invention relates to a packaging apparatus.

BACKGROUND

In JP 2009-126550 A, there is described a packaging apparatus that packages an article to be packaged by covering the article to be packaged with a stretched film and by overlapping a peripheral edge portion of the film below the article to be packaged. The packaging apparatus is provided with a heating unit that heats the film positioned below the article to be packaged that has been packaged. In the packaging apparatus, the film is heat sealed (welded) by the peripheral edge portion of the overlapped film contacting an upper surface of the heating unit.

SUMMARY

As the above-described packaging apparatus, there is an apparatus provided with a heater roller as the heating unit. In general, the heater roller is provided in plurality. In general, each of the plurality of heater rollers has a contact portion with the article to be packaged (upper surface) arranged to be in the same height position. In order for these heater rollers to contact with the article to be packaged, the contact portion of the heater rollers is positioned slightly higher than a conveyance surface that discharges the article to be packaged on the heater roller. In this configuration, when the article to be packaged is on the heater rollers, the article to be packaged is in a state of getting on the heater roller on an upstream side in a discharge direction, whereby the article to be packaged is tilted upward. In a state where the article to be packaged is tilted upward, the article to be packaged contacts only one heater roller on the upstream side close to the conveyance surface, and the article to be packaged does not contact the heater roller on a downstream side. Thus, it is not possible to obtain sufficient contact time between the heater rollers and the film, whereby welding of the film may be insufficient.

Thus, one aspect of the present invention aims at providing a packaging apparatus capable of suppressing the welding of the film from being insufficient.

According to one aspect of the present invention, a packaging apparatus covering an article to be packaged with a stretched film and heat sealing a peripheral edge portion of the film overlapped below the article to be packaged includes: a packaging unit configured to install the film on the article to be packaged and to discharge the article to be packaged installed with the film along a conveyance surface; and a plurality of heater rollers configured to heat the film positioned below the article to be packaged having been discharged from the packaging unit, wherein at least two heater rollers among the plurality of the heater rollers have contact portions with the article to be packaged, positioned higher than the conveyance surface, among the two heater rollers, height of the contact portion of the heater roller on a upstream side in a discharge direction relative to the conveyance surface is lower than height of the contact portion of the heater roller on a downstream side in the discharge direction relative to the conveyance surface, and the discharge direction of the article to be packaged when the article to be packaged is positioned on the two heater rollers is tilted upward from a direction along the conveyance surface toward a downstream side in the discharge direction.

In the packaging apparatus, the discharge direction of the article to be packaged when the article to be packaged is positioned on two heater rollers is tilted upward from a direction along the conveyance surface toward a downstream side in the discharge direction. That is, the article to be packaged positioned on the two heater rollers is in a state of being tilted diagonally upward relative to the conveyance surface. Thus, when the article to be packaged discharged from the packaging unit is in a tilted state getting on the heater roller on the upstream side, a tip side of the article to be packaged may be contacted with the heater roller on the downstream side. Therefore, in this packaging apparatus, it is possible to secure the contact time between the article to be packaged and the heater rollers, whereby it is possible to suppress the welding of the film from being insufficient.

In one embodiment, each of the plurality of heater rollers may have the same shape. Accordingly, commonization of a component of the heater roller becomes possible.

In one embodiment, a height change mechanism that changes height of the contact portion of the heater roller relative to the conveyance surface may also be provided. Accordingly, it is possible to change the height of the contact portion of the heater roller relative to the conveyance surface corresponding to a shape of the article to be packaged. Thus, even in a case where a form of the article to be packaged is different, each of the plurality of heater rollers may be contacted to an underside of the article to be packaged.

In one embodiment, the article to be packaged may be a commodity placed on a tray. The apparatus may be provided with a control unit that controls operation of the height change mechanism, and a storage unit that stores commodity information according to the commodity. The control unit may acquire the commodity information from the storage unit, and the control unit may control the operation of the height change mechanism so as to change the height of the contact portion of the heater roller relative to the conveyance surface corresponding to the acquired commodity information. Accordingly, corresponding to the acquired commodity information, it is possible to appropriately set the height of the contact portion of the heater roller relative to the conveyance surface.

According to one aspect of the present invention, it is possible to suppress the welding of the film from being insufficient.

BRIEF DESCRIPTION OF THE DRAWINGS

FIGS. 7A and 7B are views illustrating operation of the packaging apparatus;

DETAILED DESCRIPTION

Hereinafter, a preferred embodiment of one aspect of the present invention is described in detail with reference to the attached drawings. Note that in descriptions of the drawings, the same or equivalent element is denoted by the same reference sign, and a duplicated description is omitted.

Figure 1:
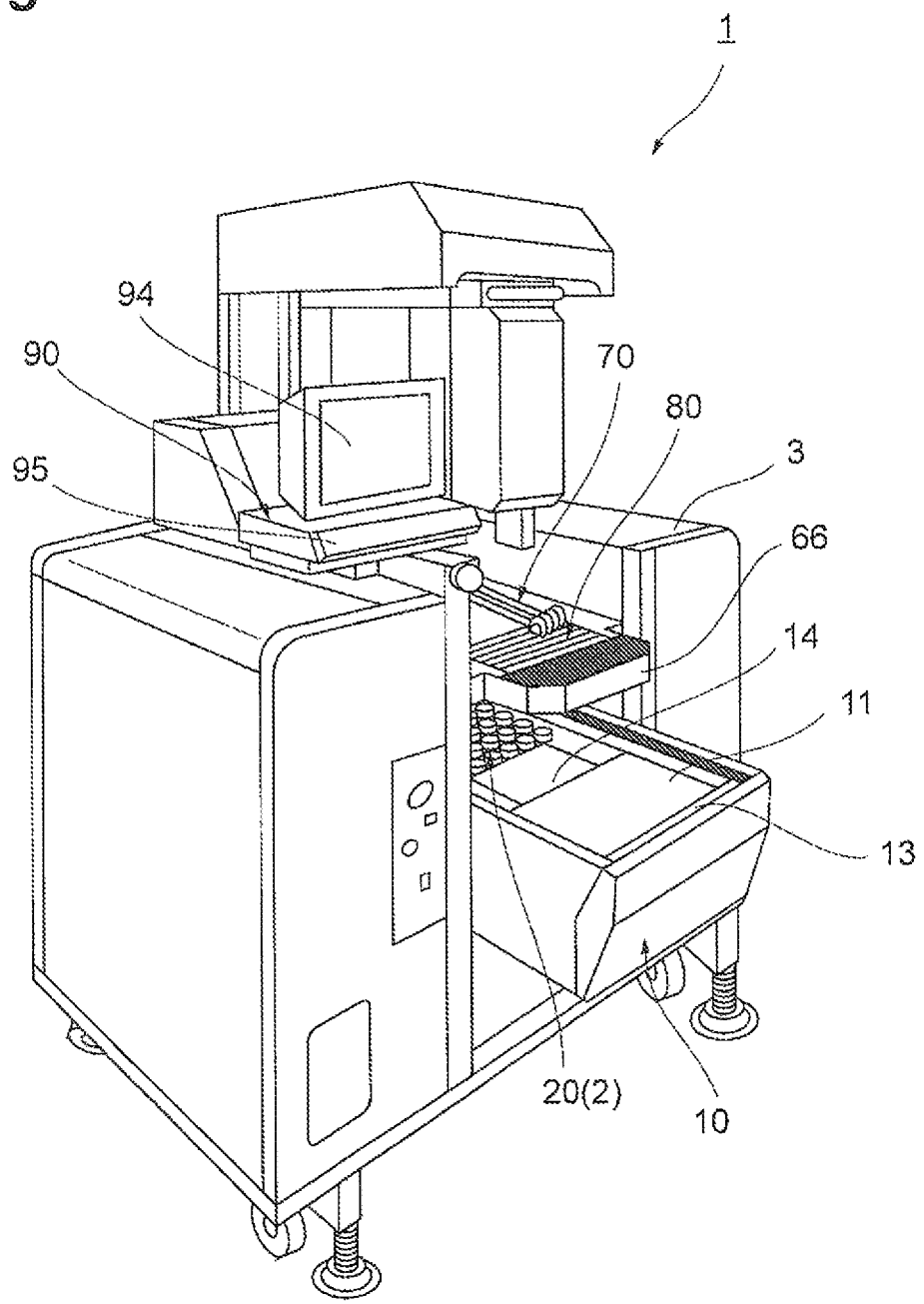
FIG. 1 is a perspective view illustrating an external appearance of a packaging apparatus according to one embodiment.
Figure 2:
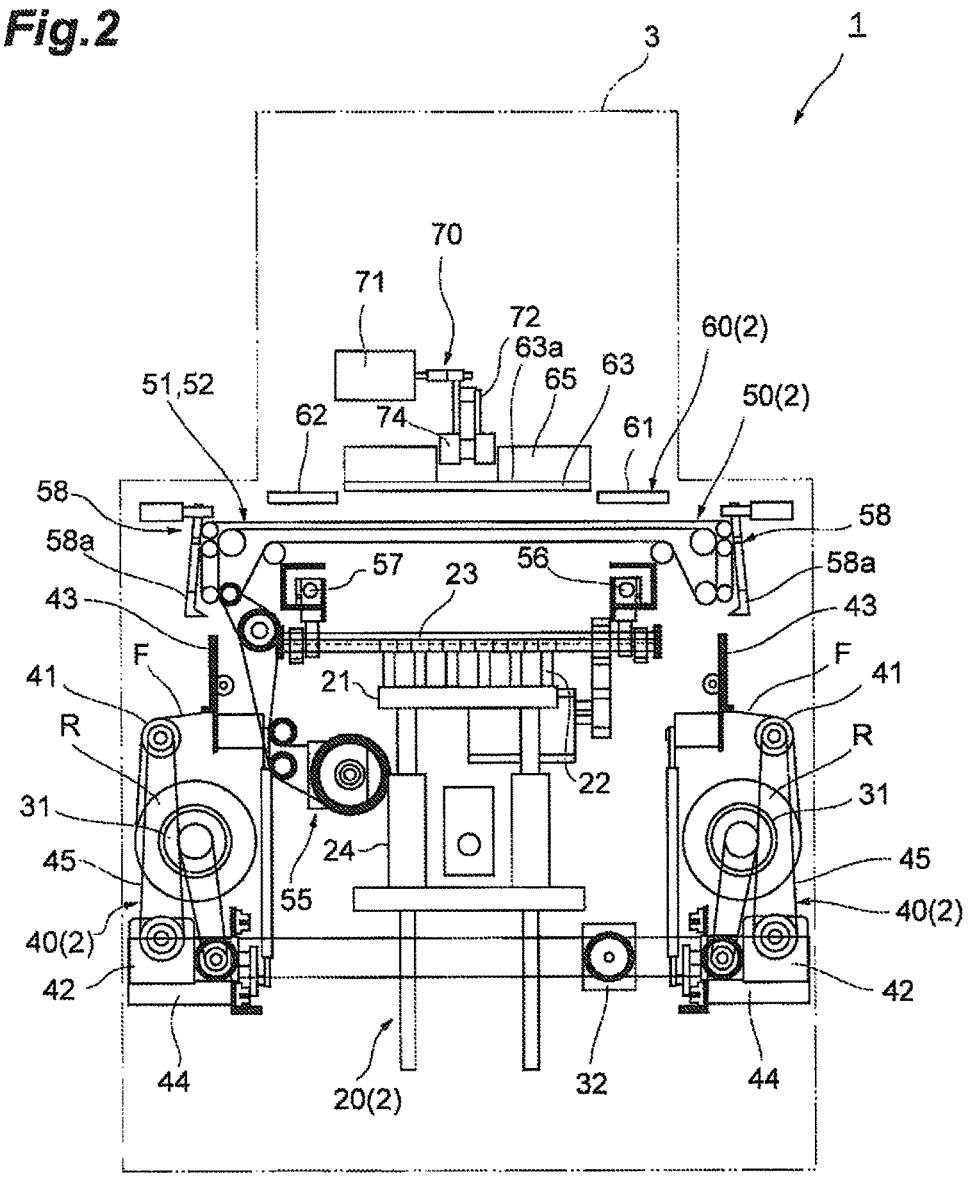
FIG. 2 is a front view illustrating an internal configuration of the packaging apparatus.
Figure 3:
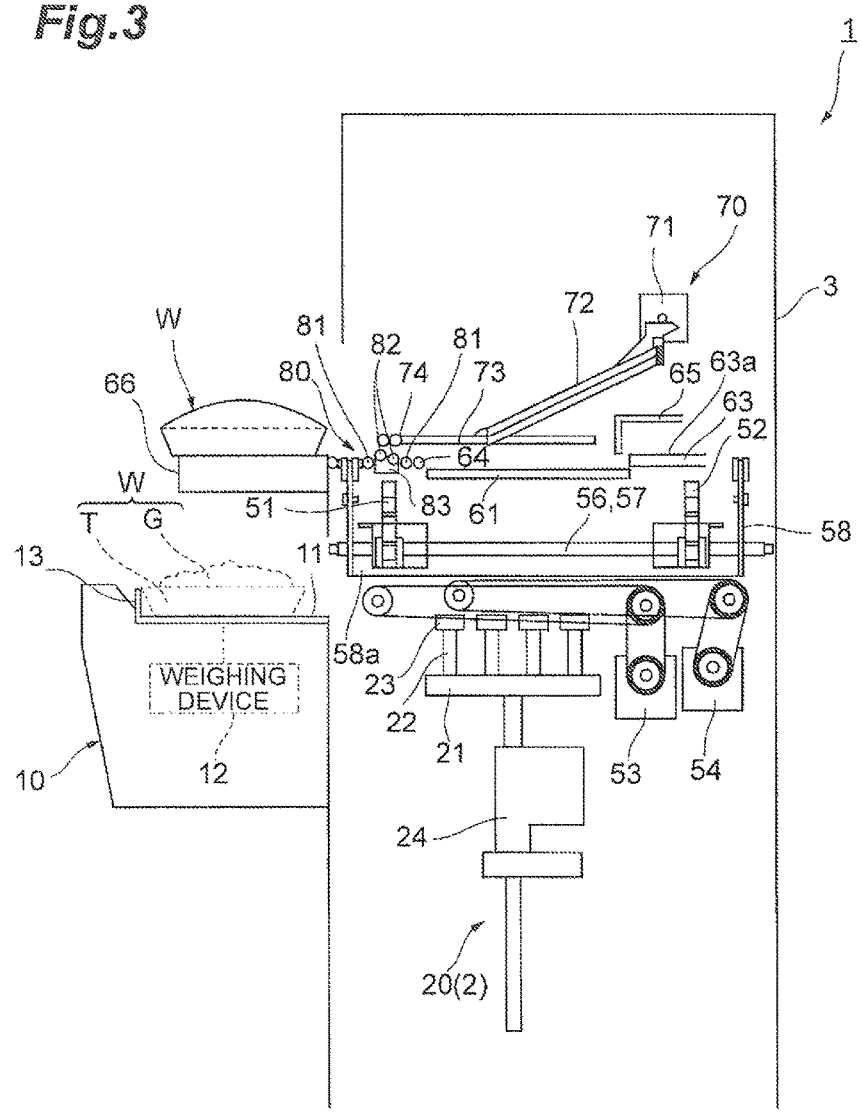
FIG. 3 is a side view illustrating the internal configuration of the packaging apparatus.
Figure 4:
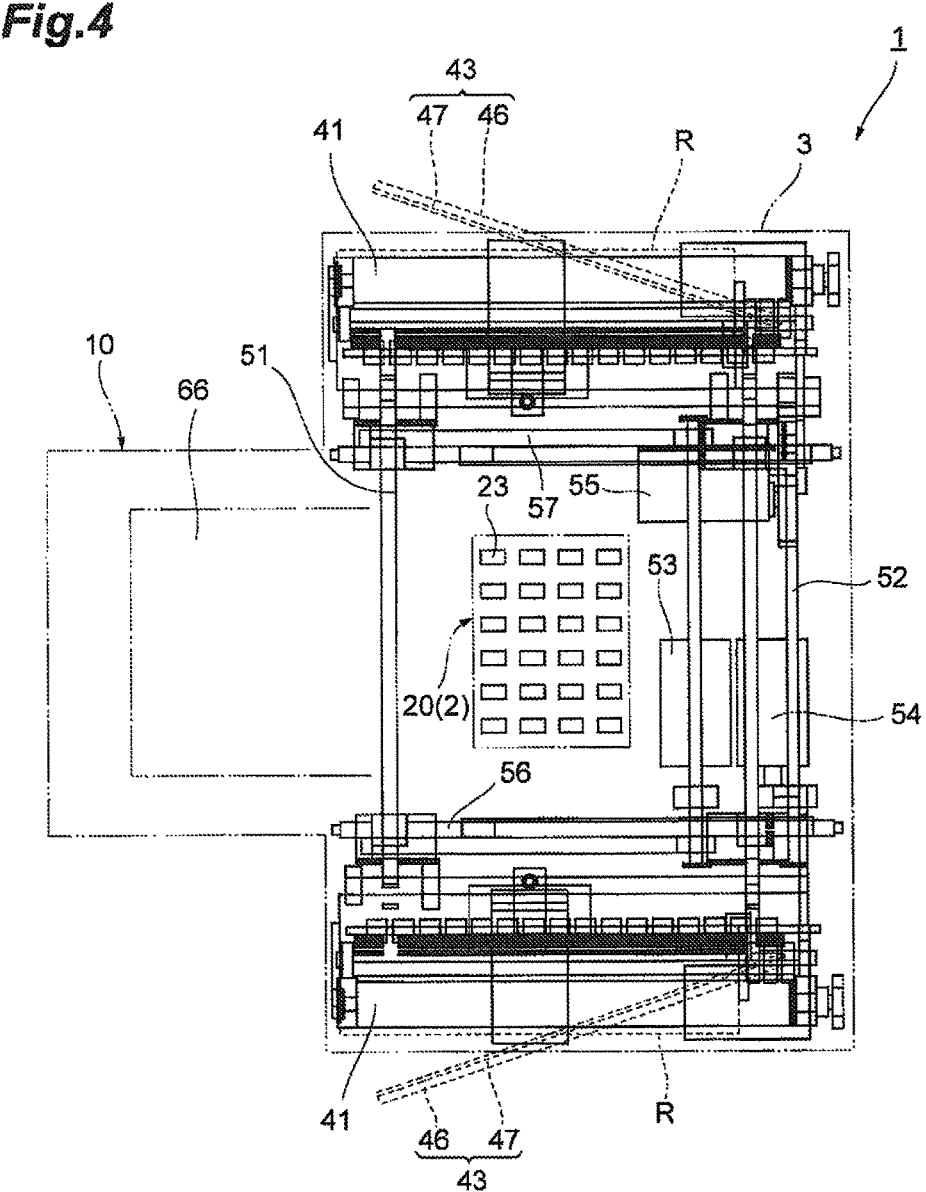
FIG. 4 is a plan view illustrating the internal configuration of the packaging apparatus.
Figure 5:
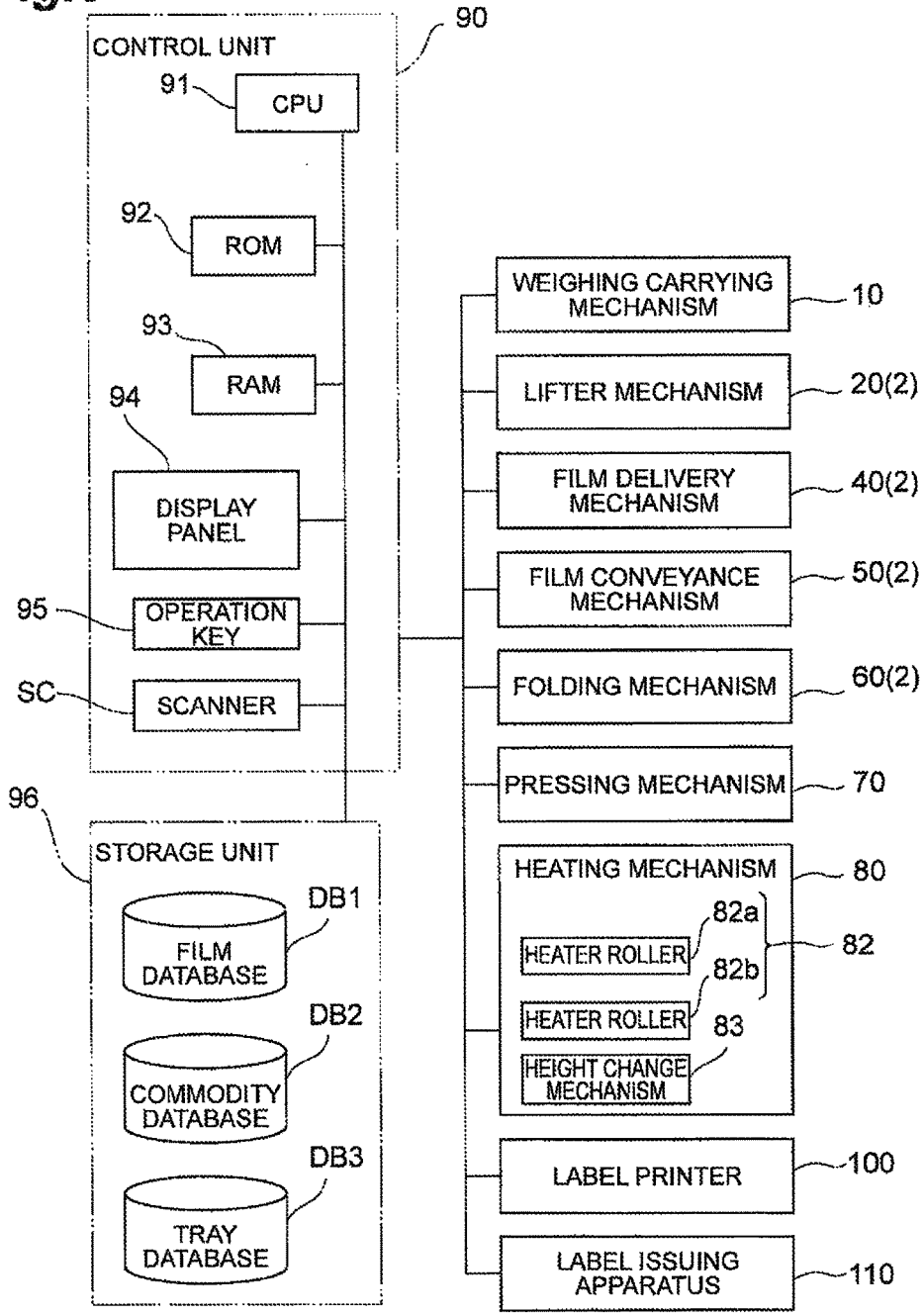
FIG. 5 is a block diagram illustrating a configuration of the packaging apparatus.

FIG. 1 is a perspective view illustrating an external appearance of a packaging apparatus according to one embodiment. FIG. 2 is a front view illustrating an internal configuration of the packaging apparatus illustrated in FIG. 1. FIG. 3 is a side view illustrating the internal configuration of the packaging apparatus. FIG. 4 is a plan view illustrating the internal configuration of the packaging apparatus. FIG. 5 is a block diagram illustrating a configuration of the packaging apparatus. In descriptions below, a vertical direction in FIG. 2 is referred to as a "vertical direction" of a packaging apparatus 1, a right and left direction therein is referred to as a "right and left direction" of the packaging apparatus 1, and a right and left direction in FIG. 3 is referred to as a "back and forth direction" of the packaging apparatus 1.

The packaging apparatus 1 illustrated in FIGS. 1 to 5 is an apparatus that stretch packages an article to be packaged W. The packaging apparatus 1 pushes up the article to be packaged W, which is a commodity G such as perishable foodstuff placed on a tray T, against a stretch film F as a stretched packaging material from below. The packaging apparatus 1 overlaps (folds) a peripheral edge portion of the stretch film F below the tray T. The packaging apparatus 1 heat seals the overlapped portion. Accordingly, the packaging apparatus 1 stretch packages the article to be packaged W. In addition to a film packaging function, the packaging apparatus 1 according to this embodiment is also provided with a weighing function and a pricing function by sticking a label.

The packaging apparatus 1 is provided with a weighing carrying mechanism 10, a lifter mechanism 20, a roll supporting mechanism 30, a film delivery mechanism 40, a film conveyance mechanism 50, a folding mechanism 60, a pressing mechanism 70, a heating mechanism (heating unit) 80, a control unit 90, a label printer 100, and a label issuing apparatus 110. In this embodiment, a packaging unit 2 is constituted of the lifter mechanism 20, the film delivery mechanism 40, the film conveyance mechanism 50, and the folding mechanism 60. The packaging unit 2 installs the stretch film F on the article to be packaged W. The packaging unit 2 discharges the article to be packaged W on which the stretch film F has been installed along a conveyance surface 63a (described below).

[Weighing Carrying Mechanism]

The weighing carrying mechanism 10 weighs the commodity G of the article to be packaged W. The weighing carrying mechanism 10 carries the article to be packaged W in the packaging apparatus 1. The weighing carrying mechanism 10 is provided to a central part in the front of a main body 3 of the packaging apparatus 1. The weighing carrying mechanism 10 has a weighing device 12, an extrusion bar 13, a conveyer 14, and a camera 15. The weighing device 12 weighs weight of the article to be packaged W placed on a weighing tray 11. The extrusion bar 13 extrudes the article to be packaged W toward the lifter mechanism 20. The conveyer 14 conveys the article to be packaged W that has been extruded by the extrusion bar 13 to the lifter mechanism 20. The camera 15 images the article to be packaged W. Operation of the weighing carrying mechanism 10 is controlled by a control unit 90.

The weighing device 12 outputs information on the weight of the article to be packaged W that has been weighed to the control unit 90. The extrusion bar 13 is provided on the weighing tray 11. The extrusion bar 13 extends along a width direction of the weighing tray 11. The extrusion bar 13 is positioned at a front end of the weighing tray 11 as an initial position. The extrusion bar 13 is provided to be movable in the back and forth direction by a driving device, which is not illustrated. The conveyer 14 is provided on a rear end side of the weighing tray 11. The conveyer 14 is provided to be movable in the right and left direction by the driving device, which is not illustrated. The camera 15 images the article to be packaged W placed on the weighing tray 11. The camera 15 outputs image information that has been imaged to the control unit 90.

As illustrated in FIG. 3, when the article to be packaged W is placed on the weighing device 12, the weighing carrying mechanism 10 weighs the weight of the article to be packaged W by the weighing device 12. The weighing carrying mechanism 10 images the article to be packaged W by the camera 15 arranged above the weighing tray 11. Then, the weighing carrying mechanism 10 extrudes the article to be packaged W to the side of the lifter mechanism 20 by the extrusion bar 13. Then, the weighing carrying mechanism 10 conveys the article to be packaged W to the lifter mechanism 20 by the conveyer 14.

The weighing carrying mechanism 10 has a centering mechanism for the article to be packaged W. Specifically, the weighing carrying mechanism 10 performs centering of the article to be packaged W by operating the conveyer 14 corresponding to a acquired position of the article to be packaged W based on the image that has been imaged by the camera 15. In detail, the weighing carrying mechanism 10 moves a position of the conveyer 14 in the right and left direction corresponding to the position of the article to be packaged W on the weighing tray 11. The weighing carrying mechanism 10 positions the conveyer 14 in the front (center) of the article to be packaged W, which is extruded by the extrusion bar 13. When the article to be packaged W is positioned on the conveyer 14, the weighing carrying mechanism 10 moves the position of the conveyer 14 to the central part, which is an initial position thereof. The weighing carrying mechanism 10 subsequently conveys the article to be packaged W to the lifter mechanism 20 by the conveyer 14. Accordingly, even in a case where the article to be packaged W is placed in a position other than the central part of the weighing tray 11, the weighing carrying mechanism 10 can deliver the article to be packaged W always in the same position relative to the lifter mechanism 20.

[Lifter Mechanism]

The lifter mechanism 20 pushes the article to be packaged W upward. The lifter mechanism 20 is provided on a rear side of the weighing carrying mechanism 10. When the lifter mechanism 20 receives the article to be packaged W from the weighing carrying mechanism 10, the lifter mechanism 20 pushes the article to be packaged W upward. The lifter mechanism 20 has a support base 21, a plurality of support bars 22, a plurality of support members 23, and an electric ball screw mechanism 24. The plurality of support bars 22 is fixed on the support base 21. Each support member 23 is turnably provided to an upper end of each of the support bars 22. The support members 23 support a bottom face of the tray T. The electric ball screw mechanism 24 moves the support base 21 up and down. Operation of the lifter mechanism 20 is controlled by the control unit 90.

In the lifter mechanism 20, due to moving of the support base 21 by the electric ball screw mechanism 24, the support bars 22 and the support members 23 move in the vertical direction. Each of the support bars 22 is provided with a hinge (not illustrated), which bends back and forth and to the right and left, at a central portion thereof. Accordingly, when a first folding plate 61, a second folding plate 62, and a third folding plate 63, which are described below, enter into the underneath of the tray T, each of the support bars 22 temporarily falls down.

[Roll Supporting Mechanism]

The roll supporting mechanism 30 holds a film roll R. In this embodiment, the roll supporting mechanisms 30 are provided to both sides of the main body 3. That is, two film rolls R may be used on the packaging apparatus 1. Around the film roll R, the stretch film F having elasticity is wrapped multiple times. The stretch film F of one of the film rolls R may be of the same type as or a different type from the stretch film F of the other of the film rolls R. In this embodiment, the two film rolls R are of the same type. Each of the stretch films F may be, for example, polyolefin, vinyl chloride, or the like. The roll supporting mechanisms 30 hold the plurality of film rolls R in an automatically switchable manner. In the roll supporting mechanisms 30, switching between the film rolls R is performed based on a remaining amount of the stretch film F. Specifically, in a case where an outer diameter of the film roll R currently being used in packaging becomes a predetermined diameter or below, the roll supporting mechanisms 30 are controlled by the control unit 90 to automatically switch to the other film roll R. The outer diameter of the film roll R may be detected, for example, by measuring by a sensor and the like. The predetermined diameter, for example, may be 90 mm.

The roll supporting mechanism 30 has a roll bar 31. The roll bar 31 is inserted through the film roll R and holds the film roll R with a holder and the like. Each of the roll bars 31 is rotatably supported to the main body 3 and is driven by one film roll drive motor 32. The film roll drive motor 32 is capable of normal and reverse rotation. The film roll drive motor 32 drives one of the roll bars 31 during the normal rotation or drives the other of the roll bars 31 during the reverse rotation.

[Film Delivery Mechanism]

The film delivery mechanism 40 passes the stretch film F, which has been drawn out from the film roll R, to a first feeder unit 51 and a second feeder unit 52 of the film conveyance mechanism 50, which is described below. As illustrated in FIG. 2, the film delivery mechanism 40 has a feeding roller 41, a feeding motor 42, a film insertion plate unit 43, and a film insertion plate drive motor 44. The feeding motor 42 drives the feeding roller 41. The film insertion plate drive motor 44 moves the film insertion plate unit 43 up and down.

The feeding roller 41 is a roller that feeds the stretch film F from the film roll R. The feeding roller 41 extends along a width direction of the film roll R (back and forth direction of the packaging apparatus 1). The feeding roller 41 is positioned above the roll supporting mechanism 30 supporting the film roll R. The feeding roller 41 is arranged outside of the roll bar 31 in the right and left direction. The feeding roller 41 is coupled to the feeding motor 42 through a belt 45, and it is rotated by operation of the feeding motor 42.

The film insertion plate unit 43 is constituted of two plate members 46 and 47. As illustrated in FIG. 2, the film insertion plate unit 43 is arranged above the film roll R, which is supported by the roll supporting mechanism 30.

The film insertion plate drive motor 44 moves the film insertion plate unit 43 up and down. The film insertion plate drive motor 44 moves the film insertion plate unit 43 up and down through a link mechanism. By moving the film insertion plate unit 43 by the film insertion plate drive motor 44, the film delivery mechanism 40 passes the stretch film F of the film roll R, which is supported by the roll supporting mechanism 30, to the film conveyance mechanism 50. Operation of the film insertion plate drive motor 44 is controlled by the control unit 90.

[Film Conveyance Mechanism]

The film conveyance mechanism 50 receives the stretch film F that has been fed from the film roll R by the film delivery mechanism 40. The film conveyance mechanism 50 conveys the stretch film F to a central part of the lifter mechanism 20. The film conveyance mechanism 50 holds the stretch film F in a stretched manner. The film conveyance mechanism 50 has the first feeder unit 51, the second feeder unit 52, a first feeder move unit 53, a second feeder move unit 54, and a feeder driving unit 55.

As illustrated in FIG. 3, the first feeder unit 51 and the second feeder unit 52 are failingly arranged. The first feeder unit 51 is arranged to a front side of the packaging apparatus 1. The second feeder unit 52 is arranged to a rear side of the packaging apparatus 1. The first feeder unit 51 and the second feeder unit 52 sandwich both sides of the stretch film F being transversely fed with upper and lower belts, and the stretch film F is conveyed by operation of the feeder driving unit 55.

Each of the first feeder unit 51 and the second feeder unit 52 is supported by slide shafts 56 and 57 to be freely movable. The slide shafts 56 and 57 extend along a width direction of the stretch film F (back and forth direction of the packaging apparatus 1). The first feeder move unit 53 moves the first feeder unit 51 along an extending direction of the slide shafts 56 and 57 (width direction of the stretch film F). The second feeder move unit 54 moves the second feeder unit 52 along the extending direction of the slide shafts 56 and 57.

Each of the first feeder unit 51 and the second feeder unit 52 has a plurality of clamps (not illustrated). The plurality of clamps operates by a solenoid and performs holding of the stretch film F as well as releasing of the holding thereof.

The film conveyance mechanism 50 has a cutter portion 58. The cutter portion 58 cuts the stretch film F. Specifically, the cutter portion 58 cuts the stretch film F after the stretch film F, which has been passed from the film delivery mechanism 40 to the film conveyance mechanism 50, is conveyed for a predetermined amount in the film conveyance mechanism 50. The cutter portion 58 cuts the stretch film F between the film delivery mechanism 40 and the film conveyance mechanism 50. The cutter portion 58 has a cutting blade 58a, which is larger than a width dimension of the stretch film F. The cutter portion 58 cuts the stretch film F by moving the cutting blade 58a by an actuator. Operation of the cutter portion 58 is controlled by the control unit 90.

As illustrated in FIG. 2, two cutter portions 58 are provided. One of the cutter portions 58 cuts the stretch film F fed from the film roll R on the right side. The other of the cutter portions 58 cuts the stretch film F fed from the film roll R on the left side.

[Folding Mechanism]

The folding mechanism 60 folds the stretch film F into an underside of the tray T. The folding mechanism 60 overlaps the peripheral edge portion of the stretch film F below the tray T. As illustrated in FIGS. 2 and 3, the folding mechanism 60 has the first folding plate 61, the second folding plate 62, and a third folding plate 63, and a folding rod 64.

The first folding plate 61 and the second folding plate 62 fold both end portions of the stretch film F in a conveyance direction into the underside of the tray T. As illustrated in FIG. 2, the first folding plate 61 and the second folding plate 62 are provided in the same height position. The first folding plate 61 and the second folding plate 62 are provided to be horizontally movable by a motor and a timing belt, which are not illustrated. Operation of the motor is controlled by the control unit 90.

The third folding plate 63 folds a side portion of the stretch film F on a side of the second feeder unit 52 into the underside of the tray T. The third folding plate 63 is positioned above the first folding plate 61 and the second folding plate 62. The third folding plate 63 is provided to be horizontally movable by the motor and the timing belt, which are not illustrated. The operation of the motor is controlled by the control unit 90. An upper surface of the third folding plate 63 folds the side portion of the stretch film F on the side of the second feeder unit 52 into the underside of the tray T. Subsequently, the article to be packaged W installed with the stretch film F is placed on the upper surface of the third folding plate 63. Thus, the upper surface of the third folding plate 63 corresponds to the conveyance surface 63a on which the article to be packaged W is discharged by the packaging unit 2 in a direction along the upper surface.

The folding rod 64 folds the side portion of the stretch film F on a side of the first feeder unit 51 into the underside of the tray T. The folding rod 64 is arranged so as to fold the side portion thereof into the underside of the tray T when the tray T is discharged by a discharge pusher 65 that extrudes the tray T toward a discharge table 66.

As illustrated in FIG. 2, the discharge pusher 65 is divided into two, to the right and to the left, so as to avoid contacting a pressing plate 73 and a pressing roller 74 of a pressing mechanism 70 described below. The discharge pusher 65 horizontally moves from the right side to the left side in FIG. 3 (toward the rear to the front of the packaging apparatus 1), and it discharges the article to be packaged W installed with the stretch film F along the conveyance surface 63a. Thus, the rear side of the packaging apparatus 1 corresponds to an upstream side in a discharge direction, and the front side of the packaging apparatus 1 corresponds to a downstream side in the discharge direction. Note that the discharge direction of the article to be packaged W is basically along the back and forth direction of the packaging apparatus 1. Note that, however, as described below, at least when the article to be packaged W is positioned on a heater roller 82, the discharge direction of the article to be packaged W is tilted upward from a direction along the conveyance surface 63a toward the downstream side in the discharge direction.

[Pressing Mechanism]

The pressing mechanism 70 applies an external force to the article to be packaged W positioned on the heater roller 82 described below. The pressing mechanism 70 applies the external force to the article to be packaged W such that contact pressure between the heater roller 82 and the article to be packaged W becomes large. The pressing mechanism 70 has a servo motor 71, an arm 72 connected to the servo motor 71, the pressing plate 73 connected to the arm 72, and the plurality of pressing rollers 74 provided to the pressing plate 73.

The arm 72 is connected to the servo motor 71 at one end thereof. The arm 72 swings interlocking with operation of the servo motor 71. The pressing plate 73 is connected to the other end of the arm 72. The pressing plate 73 is attached to the arm 72 so as to maintain it to be horizontal. The pressing roller 74 is provided to a front end of the pressing plate 73. The pressing roller 74 is, for example, a spongy roller containing silicon as a raw material. The pressing roller 74 is rotatably attached to the pressing plate 73. In the pressing mechanism 70, when the arm 72 is swung by drive of the servo motor 71, accompanied by this, height position of the pressing plate 73 is changed.

The pressing mechanism 70 presses the article to be packaged W against the heater roller 82. At the article to be packaged W, while the tray T is being extruded to the discharge table 66 by the discharge pusher 65, the stretch film F is folded into the underside of the tray T. When this stretch film F is heat sealed by a heating mechanism 80, the pressing mechanism 70 presses the article to be packaged W against the heater roller 82. Accordingly, the contact pressure between the heater roller 82 and the article to be packaged W becomes large. A force with which the pressing mechanism 70 presses the article to be packaged W and duration of the pressing mechanism 70 pressing the article to be packaged W are adjusted by the drive of the servo motor 71. The operation of the servo motor 71 is controlled by the control unit 90.

When the article to be packaged W is pushed up by the lifter mechanism 20 and is stopped, the pressing mechanism 70 presses the article to be packaged W with deadweight of the pressing plate 73 and the like. At this time, the servo motor 71 does not drive. Accordingly, the pressing mechanism 70 prevents the article to be packaged W from losing posture thereof and falling down.

[Heating Mechanism]

The heating mechanism 80 heat seals the stretch film F that is overlapped below the tray T. The heating mechanism 80 has a plurality of conveyance rollers 81, the plurality of heater rollers 82, and a height change mechanism 83. The heating mechanism 80 heat seals the article to be packaged W that is extruded by the discharge pusher 65 while conveying it by the conveyance rollers 81 and the heater rollers 82.

The plurality of conveyance rollers 81 is arranged before and after the heater rollers 82. The plurality of conveyance rollers 81, for example, is arranged so as to sandwich the heater rollers 82. The plurality of conveyance rollers 81 is rotatably supported by a supporting mechanism, which is not illustrated.

The plurality of heater rollers 82 heats the stretch film F positioned below the article to be packaged W discharged from the packaging unit 2. The plurality of heater rollers 82 includes a heater roller 82a arranged close the conveyance surface 63a on the upstream side in the discharge direction and a heater roller 82b arranged on the downstream side in the discharge direction. The plurality of heater rollers 82 is rotatably supported by the height change mechanism 83. Each of the heater roller 82a and the heater roller 82b is arranged such that a contact portion 84a and a contact portion 84b with the article to be packaged W is positioned higher than the conveyance surface 63a. The heater roller 82a and the heater roller 82b are positioned such that height of the contact portion 84a of the heater roller 82a relative to the conveyance surface 63a is lower than height of the contact portion 84b of the heater roller 82b relative to the conveyance surface 63a. Each of the heater roller 82a and the heater roller 82b may have the same shape.

The heater roller 82 has a cylindrical shape. The heater roller 82 has a cylindrical heater (not illustrated) inserted therein. The heater is an electric cartridge heater. The heater is not in contact with the heater roller 82. Accordingly, the heater is not rotated with the heater roller 82.

The temperature at which the heater roller 82a heats the stretch film F and that at which heater roller 82b heats the stretch film F may but need not be the same. In the constitution such that heater roller 82a and heater roller 82b are respectively heated at different temperatures, the overlapping part of the stretch film F is positioned on a contact portion 84a and positions the non-overlapping part of the stretch film F is positioned on a contact portion 84b, by pausing conveyance of the article to be packaged W by the discharge pusher 65 when the article to be packaged W is positioned on the two heater rollers 82, for example. At which time, the temperature at which the heater roller 82a heats the stretch film F is set higher than that at which heater roller 82b heats the stretch film F. The stretch film F can thus be heated at temperatures appropriate to the part the stretch film F overlaps and the part the stretch film F does not overlap, respectively. As a result, the stretch film F can be heat-sealed with certainty.

The height change mechanism 83 supports the heater rollers 82. The height change mechanism 83 changes the height of the contact portions 84 between the article to be packaged W and the heater rollers 82 relative to the conveyance surface 63a. The height change mechanism 83, for example, converts movement of a servo motor by a worm gear and the like into movement in the vertical direction. Operation of the height change mechanism 83 is controlled by the control unit 90. The control unit 90 acquires commodity information of the commodity G from a storage unit 96, which is described below. Corresponding to the commodity information, the control unit 90 controls the height change mechanism 83 so as to change the height of the contact portions 84 of the heater rollers 82 relative to the conveyance surface 63a.

[Control Unit]

The control unit 90 controls operation of the packaging apparatus 1. The control unit 90 is a computer constituted of a CPU 91, a ROM 92, and a RAM 93. The control unit 90 is connected to each unit constituting the packaging apparatus 1. In the ROM 92, control program for controlling the packaging apparatus 1 is stored. Based on the control program stored in the ROM 92, the CPU 91 controls the packaging apparatus 1. The RAM 93 functions as a work memory used when the control program stored in the ROM 92 is executed by the CPU 91. The control unit 90 also has a display panel 94, an operation key 95, and a scanner SC (bar code reader). The display panel 94 is a touch panel type display, and an operation button is arranged on the panel.

The control unit 90 controls operation of each of the above-described mechanisms. Based on a signal indicating weight of the commodity G weighed by the weighing carrying mechanism 10, the control unit 90 performs calculation and the like of a price of the commodity G. The control unit 90 controls operation of the label printer 100 that prints the weight, the price, and the like of the commodity G on a label as well as operation of the label issuing apparatus 110.

The storage unit 96 is connected to the control unit 90. The storage unit 96 stores a film database DB1, a commodity database DB2, and a tray database DB3. The film database DB1 stores data related to characteristics of multiple types of stretch films F for each type of the stretch film F. Specifically, the film database DB1 stores the data such as thickness, a material, and a film width of the stretch film F for each film number.

In the commodity database DB2, data related to commodity information of the commodity G (unit price data, characteristics of the commodity G) is stored for each type of the commodity G. Specifically, in the commodity database DB2, for each call out number of the commodity G, there is stored data of a shape and the like of the commodity G, data of a unit price of the commodity G, and data of a tray number of one or a plurality of trays T to be used. In the commodity database DB2, the data related to the commodity information of the commodity G is stored in association with a bar code C indicating the commodity information of the commodity G. Furthermore, in the commodity database DB2, the type of the commodity G is stored in association with the height of the contact portions 84 of the heater rollers 82 relative to the conveyance surface 63a.

In the tray database DB3, data related to characteristics of the tray T is stored for each type of the tray T. In the tray database DB3, for each of the tray numbers, there is stored the data such as dimensions, a shape, a material, a tare weight (tray weight, or tray weight added with film weight), and the like of the tray T.

Each of the databases DB1, DB2, and DB3. May be rewritten with updated data. The data may be updated by inputting from the display panel 94, the operation key 95, or the like or by receiving data forwarded from an external device, and the like.

Figure 6:
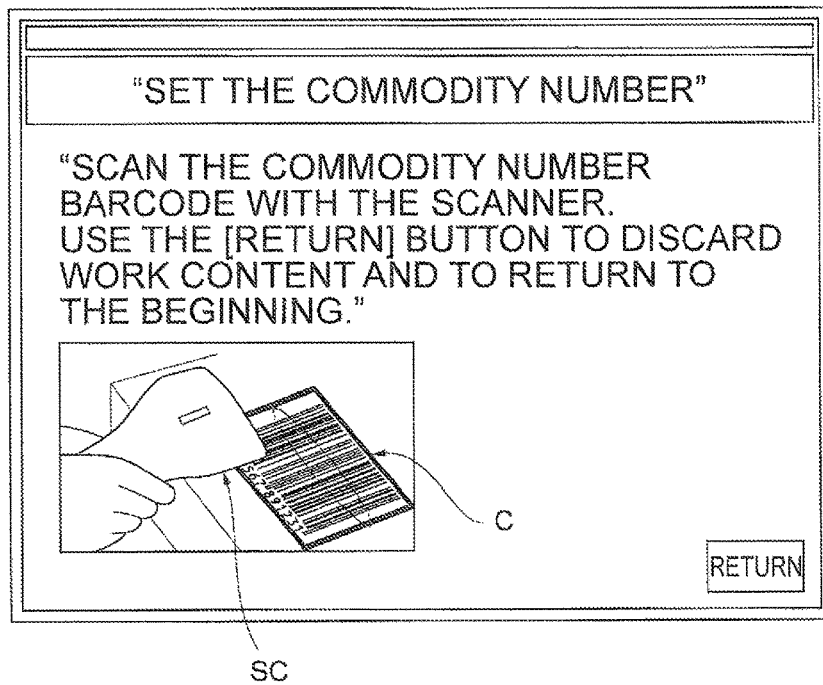
FIG. 6 is a view exemplifying guidance for an operator of the packaging apparatus.
Figure 8A:
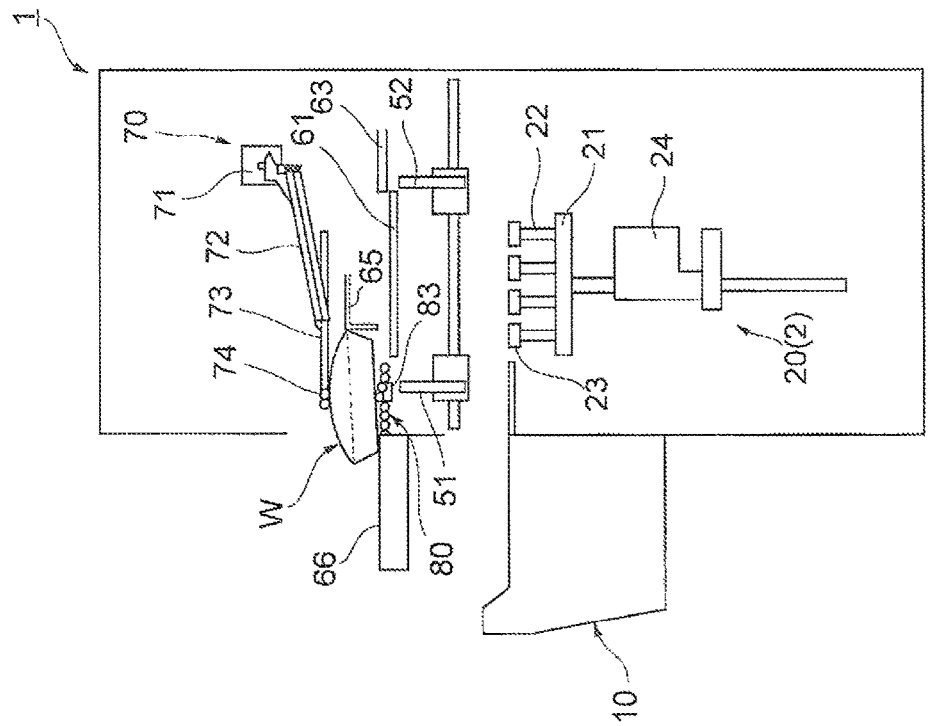
FIGS. 8A and 8B are views illustrating the operation of the packaging apparatus.
Figure 8B:
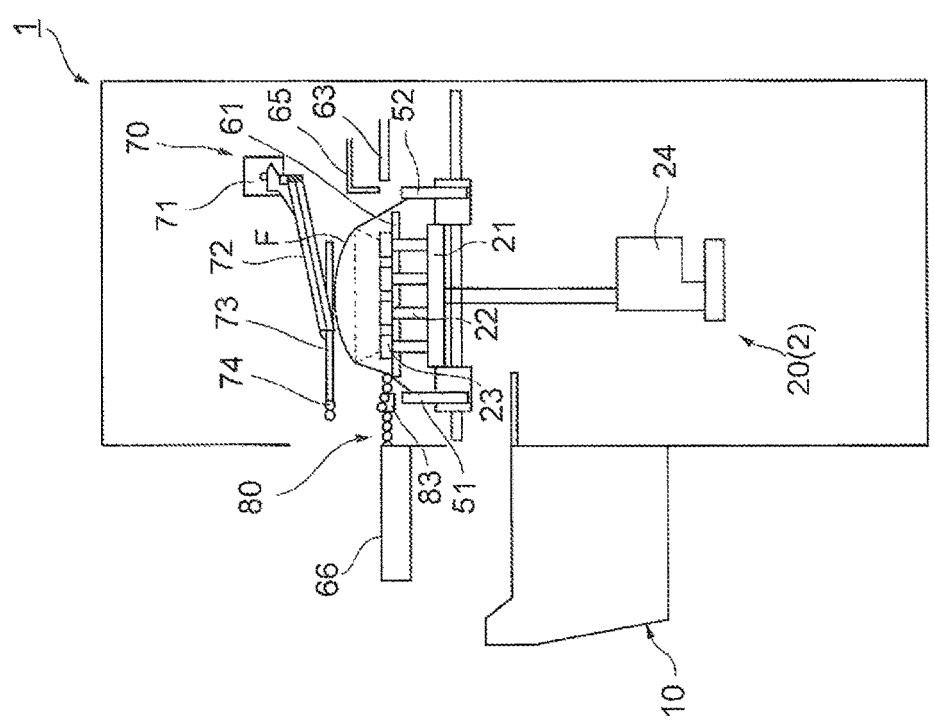
Figure 9:
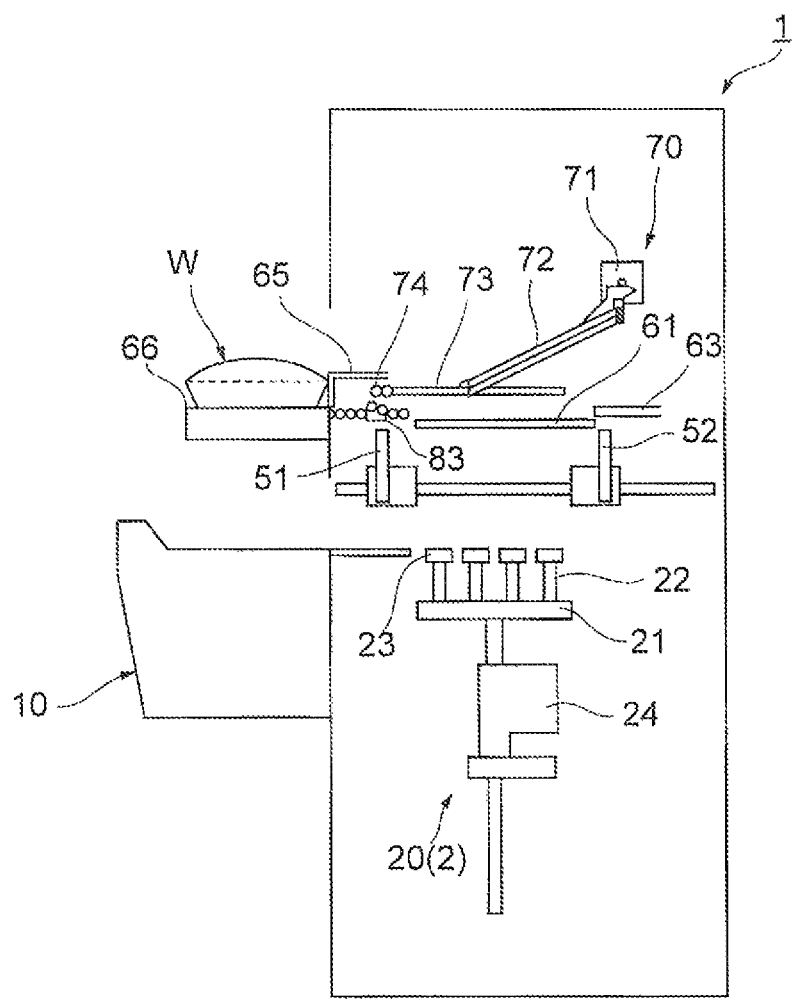
FIG. 9 is a view illustrating the operation of the packaging apparatus.

The control unit 90 acquires the commodity information of the commodity G from the storage unit 96. The control unit 90 controls the height change mechanism 83 corresponding to the commodity information. The control unit 90 controls the height change mechanism 83 and causes the height change mechanism 83 to change the height of the contact portions 84 of the heater rollers 82 relative to the conveyance surface 63a. Specifically, the control unit 90 acquires, from the storage unit 96, the commodity information corresponding to a commodity (number) selected by an operator of the packaging apparatus 1 from the display panel 94 or the operation key 95. Corresponding to the acquired commodity information, the control unit 90 controls the height change mechanism 83. The commodity information may also be acquired from a bar code. Specifically, the control unit 90 acquires the commodity information corresponding to the bar code C, which has been scanned with the scanner SC by the operator of the packaging apparatus 1, from the storage unit 96. In this case, as illustrated in FIG. 6, guidance may be displayed for the operator of the packaging apparatus 1. As the guidance, it is possible to display, for example, an image illustrating how the bar code C is to be scanned with the scanner SC as well as a text saying, for example, "scan the commodity number bar code with the scanner".

[Label Printer]

The label printer 100 prints the commodity information, the weight of the commodity G, the price, and the like on a label. Based on instruction of the control unit 90, the label printer 100 outputs the printed label. The label printer 100 is provided in plurality. The plurality of label printers 100 is set to be automatically switch able. Each of the label printers 100 is automatically switched by the control unit 90 based on the number of the remaining labels. Specifically, in a case where the number of the remaining labels of the label printer 100 currently used in packaging becomes the predetermined number or below, the label printer 100 currently used in packaging is automatically switched to another label printer 100. The number of the remaining labels may be acquired by measuring with a sensor or the like that detects the number of the remaining labels. The number of the remaining labels may also be acquired by subtracting the number of already issued labels from the number of all labels in one label roll currently used in the packaging.

[Label Issuing Apparatus]

The label issuing apparatus 110 sticks the label on the stretch film F that is packaged on the article to be packaged W. The label issuing apparatus 110 receives the label outputted from the label printer 100. While the article to be packaged W is extruded toward the discharge table 66 by the discharge pusher 65, the label issuing apparatus 110 sticks the label on the article to be packaged W.

Subsequently, the operation of the packaging apparatus 1 is described with reference to FIGS. 7A, 7B, 8A, 8B, and 9. FIGS. 7A to 9 are views illustrating the operation of the packaging apparatus.

In the packaging apparatus 1, the commodity G is selected on the display panel 94 or the operation key 95. As illustrated in FIG. 7A, when the article to be packaged W is placed on the weighing tray 11, the packaging apparatus 1 weighs the article to be packaged W with the weighing device 12 and images the article to be packaged W with the camera 15. As illustrated in FIG. 7B, the weighing carrying mechanism 10 of the packaging apparatus 1 conveys the article to be packaged W to the lifter mechanism 20.

Furthermore, the stretch film F is passed from the film roll R to the film conveyance mechanism 50 by the film delivery mechanism 40. The stretch film F is cut by the cutting blade 58a of the cutter portion 58, and is formed into one sheet of rectangular stretch film F. The stretch film F is delivered above the lifter mechanism 20 by both feeder units 51 and 52. Then, above the lifter mechanism 20, the stretch film F is in a state where a periphery of the stretch film F is strongly held by function of each clamp.

Then, toward such stretch film F being strongly held at the periphery thereof, in particular at both sides thereof, the lifter mechanism 20 pushes the commodity G and the tray T up. Then, the stretch film F being strongly held at the periphery thereof extends so as to cover a top portion of the commodity G and the tray T (see FIG. 8A).

In this state, the first folding plate 61, the second folding plate 62, and the third folding plate 63 move horizontally to the underside of the tray T. At this time, in an appropriate timing, the clamps other than a clamp on a front side (left side in FIGS. 8A and 8B) release holding of the stretch film F. Accordingly, three sides of the periphery of the stretch film F are folded into the underside of the tray T. Then, the discharge pusher 65 extrudes the tray T to a side of the discharge table 66. One side of the stretch film F on the front side that has not been folded abuts on the folding rod 64. As the tray T moves to the side of the discharge table 66, the stretch film F on the front side is folded into the underside of the tray T (see FIG. 8B). At this time, the clamp on the front side releases the holding of the stretch film F. Furthermore, during this move, the stretch film F that is folded into the underside of the tray T is heat sealed. When the tray T is discharged to a position illustrated in FIG. 9, the whole commodity G and the tray T are covered by the stretch film F, coming into a packaging completed state.

Subsequently, heat sealing of the article to be packaged W by the packaging apparatus 1 is described in detail with reference to FIGS. 10A, 10B, 10C, 10D, and 10E. FIGS. 10A to 10E are views illustrating the heat sealing by the packaging apparatus according to this embodiment.

Figure 10A:
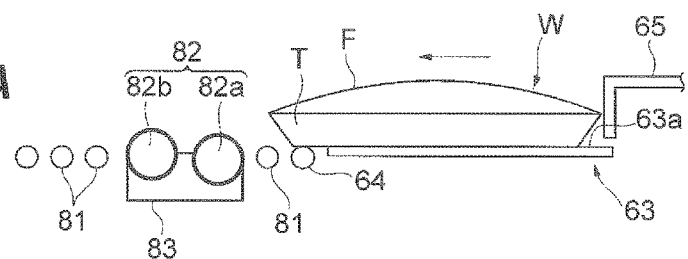
FIGS. 10A, 10B 10C, 10D, and 10E are views illustrating heat sealing by the packaging apparatus according to this embodiment.
Figure 10B:
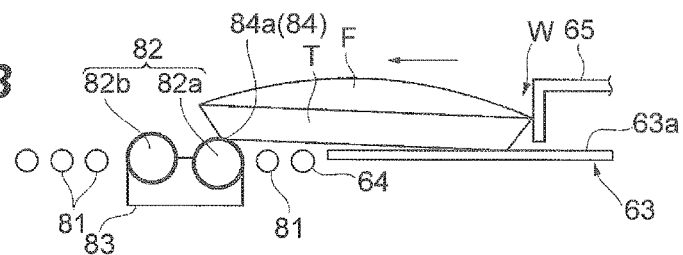
Figure 10C:
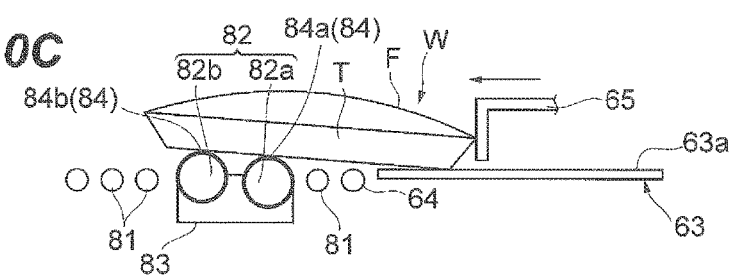
Figure 10D:
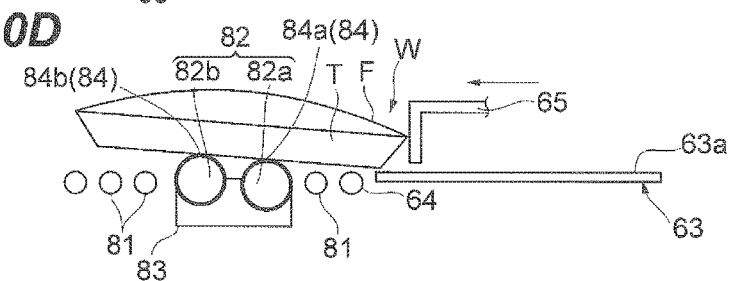
Figure 10E:
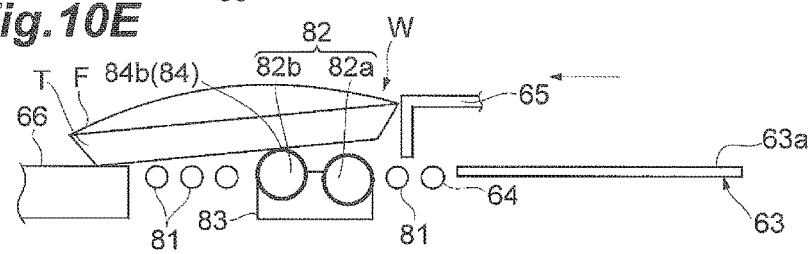

As illustrated in FIGS. 10A to 10E, the stretch film F of the article to be packaged W is heat sealed as it is heated by two heater rollers 82. Specifically, as illustrated in FIG. 10A, the article to be packaged W, to which the stretch film F has been installed by the packaging unit 2, is pushed from the rear to the front by the discharge pusher 65 along the conveyance surface 63a. Next, as illustrated in FIG. 10B, the article to be packaged W, which has been pushed by the discharge pusher 65, is in a state of getting on the heater roller 82a. The article to be packaged W on the downstream side in the discharge direction (tip side) is tilted upward. Subsequently, as illustrated in FIG. 10C, the article to be packaged W, while the tip side thereof is in a state of being tilted upward, is further pushed from the rear to the front by the discharge pusher 65. The tip side of the article to be packaged W reaches more to the front than the heater roller 82b. As illustrated in FIG. 10D, the article to be packaged W is in a state of being positioned on the two heater rollers 82. Then, as illustrated in FIG. 10E, the article to be packaged W is further pushed to the front by the discharge pusher 65. The heat sealing ends when a rear end of the article to be packaged W reaches more to the front than the heater roller 82b.

FIGS. 11A, 11B, 11C, 11D, and 11E are views illustrating heat sealing by a packaging apparatus according to a comparative example. As illustrated in FIGS. 11A to 11E, the packaging apparatus according to the comparative example is different from the packaging apparatus 1 according to this embodiment in a point that the height of the contact portion 84a of the heater roller 82a relative to the conveyance surface 63a is substantially the same height as the height of the contact portion 84b of the heater roller 82b relative to the conveyance surface 63a. Packaging operation is the same as that of the packaging apparatus 1.

Figure 11A:
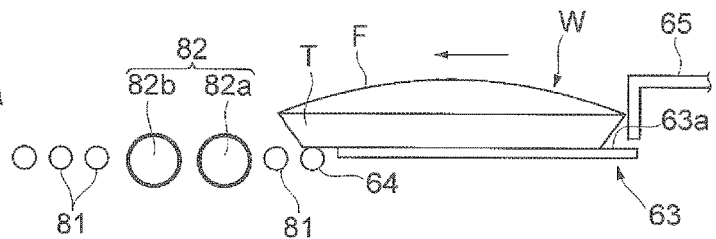
FIGS. 11A, 11B, 11C, 11D, and 11E are views illustrating heat sealing by a packaging apparatus according to a comparative example.
Figure 11B:
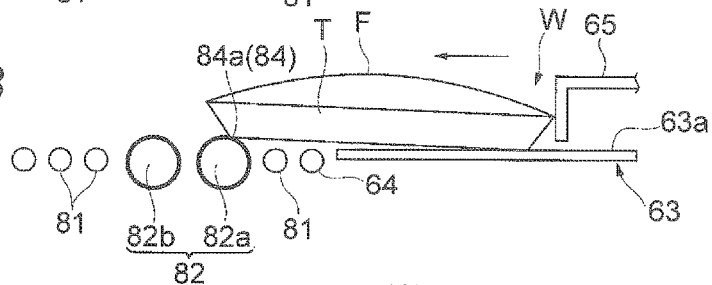
Figure 11C:
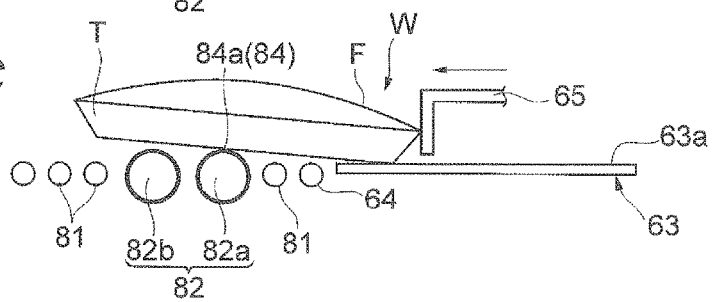
Figure 11D:
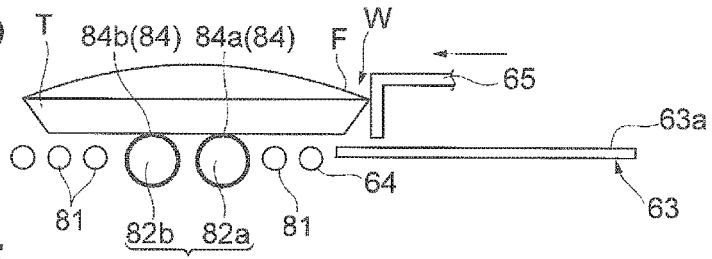
Figure 11E:
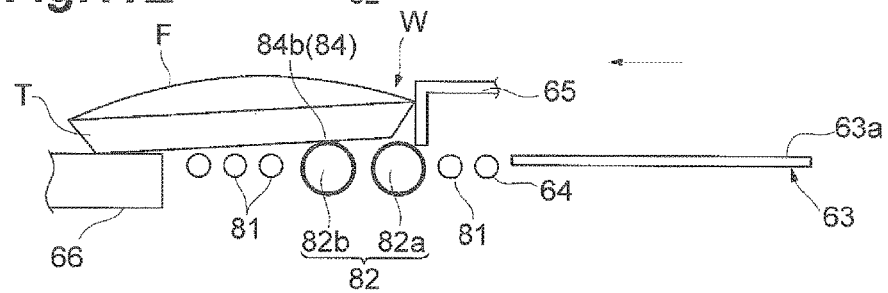

In this configuration, as illustrated in FIGS. 11C and 11D, when the article to be packaged W is positioned on the heater roller 82a, the discharge direction of the article to be packaged W is tilted upward temporarily from the direction along the conveyance surface 63a toward the downstream side in the discharge direction. Subsequently, however, when the article to be packaged W is positioned on the two heater rollers 82, the discharge direction of the article to be packaged W becomes substantially parallel to the direction along the conveyance surface 63a. That is, as illustrated in FIG. 11C, there may be a state in which the article to be packaged W only contacts the heater roller 82a, and the article to be packaged W does not contact the heater roller 82b. In this case, the stretch film F is substantially heated by one heater roller 82 only. It is not possible to obtain a sufficient contact time between the heater roller 82 and the stretch film F.

In this respect, in the packaging apparatus 1 according to this embodiment, the heater roller 82a is arranged such that the height of the contact portion 84a of the heater roller 82a relative to the conveyance surface 63a is lower than the height of the contact portion 84b of the heater roller 82b relative to the conveyance surface 63a. Thus, as illustrated in FIGS. 10C and 10D, the discharge direction of the article to be packaged W is tilted upward from the direction along the conveyance surface 63a toward the downstream side in the discharge direction not only when the article to be packaged W is positioned on the heater roller 82a but also when the article to be packaged W is positioned on the two heater rollers 82. Thus, when the article to be packaged W is positioned on the two heater rollers 82, the tip side of the article to be packaged W may contact the heater roller 82b, whereby it is possible to avoid the state in which the article to be packaged W only contacts the heater roller 82a and does not contact the heater roller 82b. Therefore, in the packaging apparatus 1, it is possible to secure contact time between the article to be packaged W and the heater roller 82.

Furthermore, the packaging apparatus 1 is provided with the height change mechanism 83. By the height change mechanism 83, the height of the contact portions 84 of the heater rollers 82 relative to the conveyance surface 63a is changed. Accordingly, corresponding to a shape of the article to be packaged W, the height of the contact portions 84 of the heater rollers 82 relative to the conveyance surface 63a may be changed. Thus, even in a case where a form of the article to be packaged W is different, each of the heater roller 82a and the heater roller 82b contacts an underside of the article to be packaged W.

As described above, in the packaging apparatus 1, the contact portions 84 between the two heater rollers 82 (the heater roller 82a and the heater roller 82b) and the article to be packaged W are positioned higher than the conveyance surface 63a, and the height of the contact portion 84a of the heater roller 82a relative to the conveyance surface 63a is set to be lower than the height of the contact portion 84b of the heater roller 82b relative to the conveyance surface 63a. Accordingly, the discharge direction of the article to be packaged W when the article to be packaged W is positioned on the two heater rollers 82 is tilted upward from the direction along the conveyance surface 63a toward the downstream side in the discharge direction. As a result, the article to be packaged W positioned on the two heater rollers 82 is in a state of being tilted diagonally upward relative to the conveyance surface 63a. Thus, when the article to be packaged W, which has been discharged from the packaging unit 2, is in a tilted state of getting on the heater roller 82a, it is possible to cause the tip side of the article to be packaged W to contact the heater roller 82b. Therefore, in the packaging apparatus 1, it is possible to secure the contact time between the article to be packaged W and the heater roller 82, whereby it is possible to suppress welding of the stretch film F from being insufficient.

In this embodiment, each of the heater roller 82a and the heater roller 82b has the same shape. Accordingly, commonization of a component of the heater roller 82 becomes possible.

In this embodiment, the height change mechanism 83 changes the height of the contact portions 84 of the heater rollers 82 relative to the conveyance surface 63a. Accordingly, corresponding to the shape of the article to be packaged W, it is possible to change the height of the contact portions 84 of the heater rollers 82 relative to the conveyance surface 63a. Thus, even in a case where the form of the article to be packaged W is different, it is possible to cause each of the heater roller 82a and the heater roller 82b to contact the underside of the article to be packaged W.

In this embodiment, the commodity information is acquired from the storage unit 96 by the control unit 90, and corresponding to the commodity information, the operation of the height change mechanism 83 is controlled by the control unit 90, whereby the height of the contact portions 84 of the heater rollers 82 relative to the conveyance surface 63a is changed. Accordingly, corresponding to the acquired commodity information, it is possible to appropriately set the height of the contact portions 84 of the heater rollers 82 relative to the conveyance surface 63a.

The present invention is not limited to the above-described embodiment. For example, the packaging apparatus 1 of the above-described embodiment is provided with the two heater rollers 82; however, the packaging apparatus 1 may also be provided with three or more heater rollers 82. In the above-described embodiment, each of the two heater rollers 82 has the same shape; however, each of the two heater rollers 82 may also have a mutually different outer diameter. In short, the discharge direction of the article to be packaged W when the article to be packaged W is positioned on the two heater rollers 82 is to be tilted upward from the direction along the conveyance surface 63a toward the downstream side in the discharge direction.

In the above-described embodiment, there is exemplified the height change mechanism 83 in which the operation thereof is controlled by the control unit 90; however, for example, it may also be a height change mechanism that changes the height of the contact portions 84 of the heater rollers 82 relative to the conveyance surface 63a by elastically supporting the heater rollers 82 so as to be rotatable by a spring or the like.

In the above-described embodiment, there has been described as one example a form in which the article to be packaged W, which is the commodity G placed on the tray T, is packaged; however, it may also be a form in which the commodity G is in a state of not being placed on the tray T.

REFERENCE SIGNS LIST 1 packaging apparatus, 2 packaging unit, 63a conveyance surface, 82 (82a, 82b) heater roller, 83 height change mechanism, 84 (84a, 84b) contact portion, 90 control unit, 96 storage unit, F stretch film (film), G commodity, T tray, and W article to be packaged.

What is claimed is:

1. A packaging apparatus covering an article to be packaged with a stretched film and heat sealing a peripheral edge portion of the film overlapped below the article to be packaged, the packaging apparatus comprising:
    a packaging unit configured to install the film on the article to be packaged and to discharge the article to be packaged installed with the film along a conveyance surface; and
    a plurality of heater rollers configured to heat the film positioned below the article to be packaged having been discharged from the packaging unit, wherein
    at least two heater rollers among the plurality of the heater rollers have contact portions with the article to be packaged, positioned higher than the conveyance surface,
    among the two heater rollers, height of the contact portion of the heater roller on a upstream side in a discharge direction relative to the conveyance surface is lower than height of the contact portion of the heater roller on a downstream side in the discharge direction relative to the conveyance surface, and
    the discharge direction of the article to be packaged when the article to be packaged is positioned on the two heater rollers is tilted upward from a direction along the conveyance surface toward a downstream side in the discharge direction.

2. The packaging apparatus according to claim 1, wherein each of the plurality of the heater rollers has the same shape.

3. The packaging apparatus according to claim 1, comprising:

a height change mechanism configured to change height of the contact portions of the heater rollers relative to the conveyance surface.

4. The packaging apparatus according to claim 3, wherein the article to be packaged is a commodity placed on a tray, the packaging apparatus including:
a control unit configured to control operation of the height change mechanism; and
a storage unit configured to store commodity information according to the commodity, wherein
the control unit acquires the commodity information from the storage unit and controls the operation of the height change mechanism so as to change the height of the contact portions of the heater rollers relative to the conveyance surface corresponding to the acquired commodity information.

5. The packaging apparatus according to claim 2, comprising:
a height change mechanism configured to change height of the contact portions of the heater rollers relative to the conveyance surface.

6. The packaging apparatus according to claim 5, wherein the article to be packaged is a commodity placed on a tray, the packaging apparatus including:
a control unit configured to control operation of the height change mechanism; and
a storage unit configured to store commodity information according to the commodity, wherein
the control unit acquires the commodity information from the storage unit and controls the operation of the height change mechanism so as to change the height of the contact portions of the heater rollers relative to the conveyance surface corresponding to the acquired commodity information.

* * * * *